(12) United States Patent
Ko et al.

(10) Patent No.: US 7,732,014 B2
(45) Date of Patent: *Jun. 8, 2010

(54) PROCESS FOR DIFFUSING TITANIUM AND NITRIDE INTO A MATERIAL HAVING A GENERALLY COMPACT, GRANULAR MICROSTRUCTURE

(76) Inventors: Philos Jongho Ko, 372 Sleepy Hollow La., Addison, IL (US) 60101; Bongsub Samuel Ko, 372 Sleepy Hollow La., Addison, IL (US) 60101

( * ) Notice: Subject to any disclaimer, the term of this patent is extended or adjusted under 35 U.S.C. 154(b) by 610 days.

This patent is subject to a terminal disclaimer.

(21) Appl. No.: 11/405,947

(22) Filed: Apr. 18, 2006

(65) Prior Publication Data

US 2007/0243412 A1    Oct. 18, 2007

(51) Int. Cl.
*C23C 16/34* (2006.01)

(52) U.S. Cl. .............................. 427/255.394; 427/435; 427/530

(58) Field of Classification Search .......... 427/255.394, 427/435, 530; 204/192.1, 192.31
See application file for complete search history.

(56) References Cited

U.S. PATENT DOCUMENTS

| | | | |
|---|---|---|---|
| 3,639,641 A | 2/1972 | Saton | |
| 4,019,928 A | 4/1977 | Beyer et al. | |
| 4,332,653 A | 6/1982 | Satoh | |
| 4,492,604 A | 1/1985 | Muller et al. | |
| 4,614,341 A * | 9/1986 | Fernandez | 473/536 |
| 5,948,177 A * | 9/1999 | Longwell et al. | 148/228 |
| 6,107,225 A * | 8/2000 | Shobu et al. | 501/92 |
| 6,645,566 B2 * | 11/2003 | Ko | 427/435 |
| 7,438,769 B2 * | 10/2008 | Ko et al. | 148/206 |

FOREIGN PATENT DOCUMENTS

JP    61-253365    * 11/1986

OTHER PUBLICATIONS

Method of manufacturing high strength steel plate having TiN and ZrN precipitates by nitriding treatment for welded structures. Derwent abstract, 2003-010895, no pages numbers or inventors available.*

* cited by examiner

*Primary Examiner*—Bret Chen
(74) *Attorney, Agent, or Firm*—Eugene M. Cummings, P.C.

(57) ABSTRACT

A method for diffusing titanium and nitride into a base material having a generally compact, granular microstructure (e.g., carbide). The method generally includes the steps of providing a base material having a generally compact, granular microstructure; providing a salt bath which includes sodium dioxide and a salt selected from the group consisting of sodium cyanate and potassium cyanate; dispersing metallic titanium formed by electrolysis of a titanium compound in the bath; heating the salt bath to a temperature ranging from about 430° C. to about 670° C.; and soaking the base material in the salt bath for a time of from about 10 minutes to about 24 hours. In accordance with another aspect of the present invention, the base material may further be treated with conventional surface treatments or coatings.

25 Claims, 4 Drawing Sheets

30a

30b

PROCESS FOR DIFFUSING TITANIUM AND NITRIDE INTO A MATERIAL HAVING A GENERALLY COMPACT, GRANULAR MICROSTRUCTURE

BACKGROUND OF THE INVENTION

The present invention generally relates to a process for diffusing titanium and nitride into a base material. More specifically, a process is provided for diffusing titanium and nitride into a base material having a generally compact, granular microstructure (e.g., carbide).

The present invention relates to a low temperature process for diffusing titanium and nitride into a base material having a generally compact, granular microstructure in the presence of electrolyzed titanium. A low temperature process is preferred in that it prevents or lessens warping and twisting of the material, two disadvantages of conventional surface treatment processes. Titanium is considered a generally inert, light-weight material which has very high tensile strength (or toughness) and excellent corrosion resistance. Accordingly, because of their inert nature, increased hardness, increased tensile strength and increased resistance to wear, products containing titanium may be used in various applications including industrial, biomedical, aerospace, automotive, defense, jewelry, tools, tool-making, gun-making applications and other such applications.

Some materials having a generally compact, granular microstructure are known to be extremely hard and capable of withstanding high temperatures. Carbide is an example of one such material. Known carbides include, but are not limited to, boron carbide ($B_4C$); chromium carbide ($Cr_3C_2$); iron carbide or cementite ($Fe_3C$); niobium carbide (NbC or $Nb_2C$); silicon carbide (SiC); tantalum carbide (TaC); titanium carbide (TiC); tungsten carbide (WC or $W_2C$); vanadium carbide (VC); zirconium carbide (ZrC); ceramic carbide; any metal alloy containing carbide, and any other metal containing carbide. In one application of carbides, cutting tools containing such are generally used instead of high-speed steel or carbon steel tools to machine tough materials. In fact, cutting tools containing carbides may be used to machine carbon steel or other tough metals.

Nevertheless, carbides are generally more brittle than some metal materials or alloys, making them susceptible to chipping and/or breaking. For example, as illustrated in FIG. 1, carbides generally comprise a compact, granular microstructure. Although the granular microstructure contributes to the hardness of the carbide, among the grains 20 are small voids 22 which perpetuate the brittleness of the carbide structure. Accordingly, it is an object of the invention to provide a process for diffusing titanium and nitride into a material having a generally compact, granular microstructure to fill the voids inherent therein in order to further provide the enhanced properties of titanium therethrough (e.g., increased toughness or tensile strength).

U.S. Pat. No. 6,645,566, which is incorporated by reference herein and made a part hereof, describes a process for diffusing titanium and nitride into a variety of base materials including steel and steel alloys, aluminum and aluminum alloys, titanium and titanium alloys. Nevertheless, U.S. Pat. No. 6,645,566 does not describe a method for diffusing titanium and nitride into a material having a generally compact, granular microstructure or otherwise containing carbide. Carbides are generally known to be structurally different from other materials, metals or metal alloys. For example, as respectively illustrated in FIGS. 2, 3, and 4, steel, aluminum and titanium (the base materials described in U.S. Pat. No. 6,645,566) generally have an amorphous microstructure including an amorphous substructure 24 a, b and c having voids 26 therethrough.

The amorphous microstructure of steel, aluminum and titanium is markedly different from the generally compact, granular microstructure of carbide. The generally granular microstructure causes carbide to be generally harder than steel, titanium, and aluminum, which have generally amorphous microstructures. Moreover, the grains 20 of the carbide microstructure are generally more compact than the amorphous substructures 24 a, b and c of steel, aluminum and titanium. Accordingly, the voids 22 among the grains 20 of carbide are generally smaller than the voids 26 a, b and c among the amorphous substructure 24 a, b and c of steel, aluminum and titanium.

For materials such as steel, aluminum and titanium, the amorphous substructure 24 a, b and c and larger voids 26 a, b and c assist in the diffusion of titanium and nitride therethrough in the process as described in U.S. Pat. No. 6,645,566. In contrast, it is generally known that it is more difficult and nearly impossible to diffuse any substance into a material having a compact, granular microstructure such as carbide. Accordingly, it is an object of the invention to diffuse titanium and nitride into a material such as carbide to fill the voids inherent in its granular microstructure, despite its compact orientation, in order to provide the enhanced properties of titanium therethrough.

Other conventional surface treatment and coating processes for providing a protective layer on a base material or for strengthening materials have been applied to materials containing carbides. However, these processes are deficient in many respects. In one example, conventional surface treatments and coating processes have been typically applied to steel and steel alloys. Steel and steel alloys are generally known to contain a high content of iron. Some conventional nitriding surface treatment processes, such as in some Physical Vapor Deposition (PVD), Chemical Vapor Deposition (CVD) and Ion Assisted Coating (IAC) processes, introduce nitrogen such that it reacts to iron in the steel or steel alloy to form a hardened ferrous nitride layer. This reaction causes the formation of a hardened ferrous nitride layer, which serves as a suitable protective layer on the base material.

These nitriding processes, however, are generally deficient when treating carbides. More specifically, carbides are generally known to contain a relatively low content of iron. As such, when applying these processes to carbides, there is generally not enough iron for nitrogen to react with. Accordingly, conventional nitriding surface treatments cannot generally form a hardened ferrous nitride layer on carbide due to its low iron content. Instead, a protective layer is formed which has a weak adhesion with the carbide surface, thereby causing it to be susceptible to chipping. It is therefore an object of the present invention to diffuse titanium and nitride into a material having a relatively low content of iron. It is further an object of the present invention to provide a process for strengthening the adhesion between a base material containing carbide and a protective layer formed by conventional surface treatments or coatings.

SUMMARY OF THE INVENTION

In view of the desired goals of the invention claimed herein, a method for diffusing titanium and nitride into a base material having a generally compact, granular microstructure and products produced thereby are provided. One example of such a base material is a material containing carbide. Surprisingly, using the present invention process, titanium and nitride are diffused into a base material having a generally compact, granular microstructure. As such, the present invention process allows for the implementation of the enhanced properties of titanium in such a base material.

The method generally includes the steps of providing a base material having a generally compact, granular microstructure; providing a salt bath which includes sodium dioxide and a salt selected from the group consisting of sodium cyanate and potassium cyanate; dispersing metallic titanium formed by electrolysis of a titanium compound in the bath; heating the salt bath to a temperature ranging from about 430° C. to about 670° C.; and soaking the base material in the salt bath for a time of from about 10 minutes to about 24 hours.

In accordance with another aspect of the present invention, the base material may be treated with conventional surface treatments or coatings. In one such embodiment, the base material may be treated using the present invention titanium and nitride diffusion process and then treated with a conventional surface treatment or coating. In yet another embodiment, the base material may be treated with a conventional surface treatment or coating and then treated using the present invention titanium and nitride diffusion process. In accordance with this embodiment, titanium and nitrogen diffuses and fills the voids of the protective layer, while also diffusing and filling in the voids among the grains of the base material structure. In this way, the diffusion from the protective layer en route to the underlying base material forms a resulting titanium interface or network therebetween. This interface or network provides for the added benefit of providing better adhesion between the protective layer and the underlying base material.

In accordance with yet another aspect of the invention, further provided is a treated article comprising a base material having a generally compact, granular microstructure; a titanium component diffused into said microstructure; and said titanium component in addition to any titanium present in the base material.

In accordance with yet another aspect of the invention, further provided is a treated article including a base material containing a carbide having a particular microstructure; a titanium component diffused into said microstructure; and said titanium component in addition to any titanium present in the base material.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

BRIEF DESCRIPTION OF THE SEVERAL VIEWS OF THE DRAWINGS

Throughout this description, reference has been and will be made to the accompanying views of the drawing wherein like subject matter has like reference numerals, and wherein.

DETAILED DESCRIPTION OF THE MULTIPLE EMBODIMENTS

Figure 1:
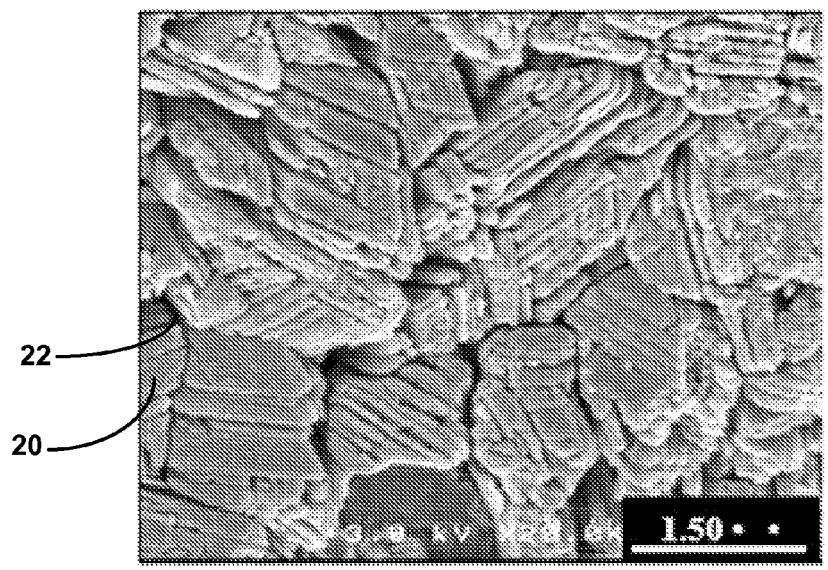
FIG. 1 is a scanning electron micrograph cross-sectional view of a representative material having a generally compact, granular microstructure such as carbide.
Figure 2:
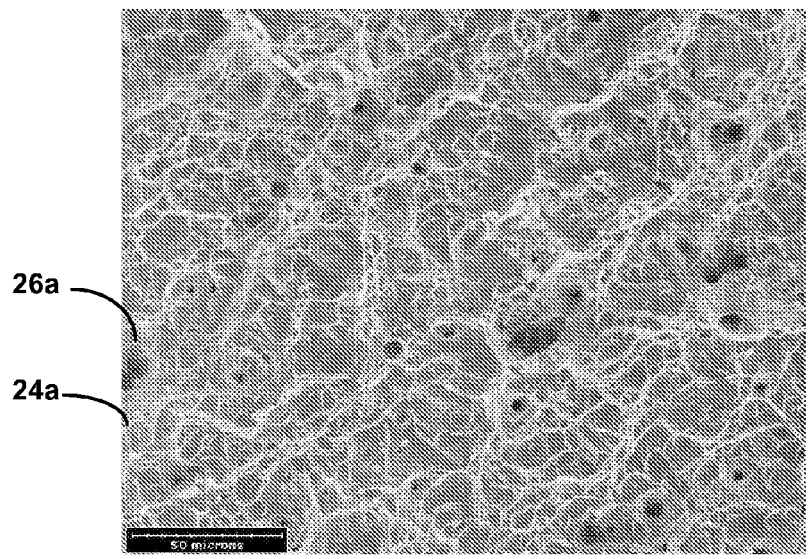
FIG. 2 is a scanning electron micrograph cross-sectional view of a representative steel having a generally amorphous structure.
Figure 3:
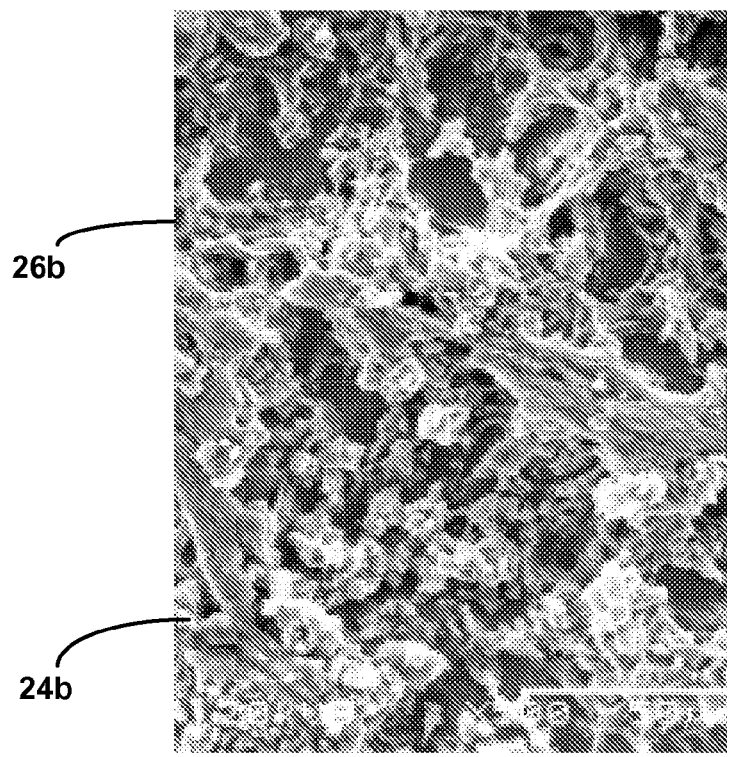
FIG. 3 is a scanning electron micrograph cross-sectional view of a representative aluminum having a generally amorphous structure.
Figure 4:
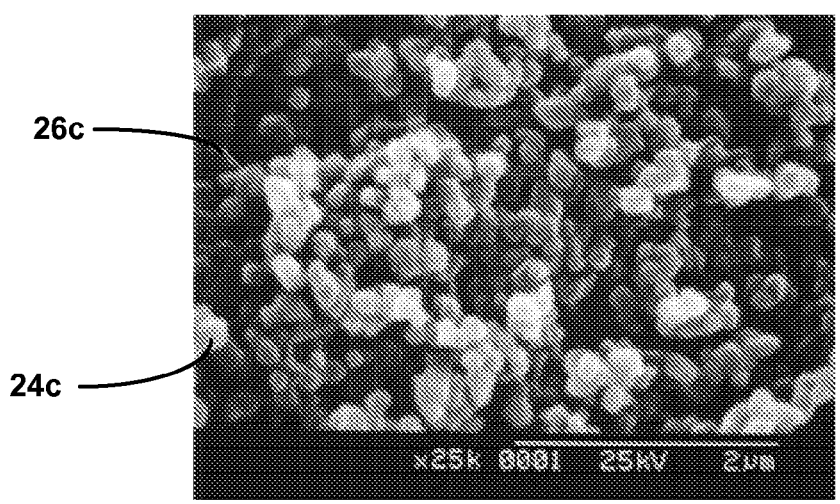
FIG. 4 is a scanning electron micrograph cross-sectional view of a representative titanium having a generally amorphous structure.

While the invention is susceptible of embodiment in many different forms and in various combinations, particular focus will be on the multiple embodiments of the invention described herein with the understanding that such embodiments are to be considered exemplifications of the principles of the invention and are not intended to limit the broad aspect of the invention. For example, the present invention is directed to any base material having a compact, granular microstructure. Although other suitable materials are contemplated, the base material may be a metal base material having a compact, granular microstructure. Carbides are also used herein to illustrate another suitable material having such a structure. Furthermore, in accordance with the teachings of the present invention, carbides include, but are not limited to, tungsten carbide (WC or $W_2C$); boron carbide ($B_4C$); chromium carbide ($Cr_3C_2$); iron carbide or cementite ($Fe_3C$) niobium carbide (NbC or $Nb_2C$); silicon carbide (SiC); tantalum carbide (TaC); titanium carbide (TiC); vanadium carbide (VC); zirconium carbide (ZrC); ceramic carbide; any metal alloy containing carbide, and any other metal containing carbide.

In one embodiment of the present invention, a moderately heated non-electrolyzed salt bath is used which contains activated-electrolyzed metallic titanium. Sodium dioxide and a salt selected from the group consisting of sodium cyanate and potassium cyanate is present in the salt bath. Additionally, up to about 20 w/w % of $NaCO_2$ or sodium chloride may further be added. To the bath is added from about 2 to about 20 micrograms of electrolyzed metallic titanium. A base material having a compact, granular microstructure is soaked in the bath for from about 10 minutes to 24 hours at from about 430° C. to about 670° C. The electrolyzed titanium catalyzes the diffusion of the titanium and nitride from the bath into about 20 to about 100 microns of the base material having a compact, granular microstructure.

Through this process, titanium and nitride are diffused into the base material having a compact, granular structure. Surprisingly, it is not necessary for the base material to have an amorphous microstructure as disclosed in U.S. Pat. No. 6,645,566, wherein the larger voids and structure assist in the diffusion or titanium and nitride therethrough. In contrast and also surprisingly, through the above described process, the electrolyzed titanium catalyzes the diffusion of the titanium and nitride from the bath into about 20 to about 100 microns of the base material. More specifically, titanium and nitride from the bath diffuse into and fill the voids of the material's granular microstructure, despite its compact orientation. Accordingly, because carbide has a compact, granular structure, any material including such may be treated with the present invention process.

One embodiment of the present invention includes a method for diffusing titanium and nitride into a base material containing carbide comprising providing a base material containing carbide, providing a salt bath which includes sodium dioxide and a salt selected from the group consisting of sodium cyanate and potassium cyanate, dispersing electrolyzed metallic titanium in said bath, heating the salt bath to a temperature ranging from about 430° C. to about 670° C.; and soaking the material in the salt bath for a time of from about 10 minutes to 24 hours, and preferably from about 2 to about 10 hours. Preferably, the salt bath includes up to about 20 w/w % of an added salt selected from the group consisting of sodium carbon dioxide, sodium carbonate, and sodium chloride. The soaking temperature advantageously ranges from about 500° C. to about 650° C., preferably from about 530° C. to about 630° C.

Accordingly, an embodiment of the present invention includes a treated article comprising a base material having a generally compact, granular microstructure; a titanium component diffused into said microstructure; and said titanium component in addition to any titanium present in the base material.

In accordance with yet another aspect of the invention, further provided is a treated article including a base material containing a carbide having a particular microstructure; a titanium component diffused into said microstructure; and said titanium component in addition to any titanium present in the base material.

U.S. Pat. No. 6,645,566 describes soaking the base material from about 2 hours to about 10 hours, and preferably about 2 hours to about 6 hours. This soaking time is generally sufficient for ample diffusion of titanium and nitride into the amorphous structure of steel, aluminum and titanium. However and surprisingly, it is found that diffusion into carbide may occur as soon as 10 minutes into the soaking process. Furthermore, it is preferable to increase the time in which the base material containing carbide is soaked in the bath in order to facilitate the diffusion of titanium and nitride into the compact, granular structure of carbide.

In accordance with another aspect of the present invention, the base material may be treated with conventional surface treatments or coatings. In one such embodiment, the base material may be treated using the present invention titanium and nitride diffusion process and then treated with a conventional surface treatment or coating. In yet another embodiment, the base material may be treated with a conventional surface treatment or coating and then treated using the present invention titanium and nitride diffusion process.

Any conventional process for treating or coating materials may be used in these embodiments. For example, the conventional processes may include, but are not limited to, heat treatment, nanocoating, ceramic coating, Physical Vapor Deposition (PVD), Chemical Vapor Deposition (CVD), Ion Assisted Coating (IAC), and other surface treatments or coating suitable for materials or metals. As explained in detail above, conventional surface treatments and coatings, when used alone, are generally deficient for carbide applications. The protective layer formed by these conventional processes generally has a weak adhesion with the carbide surface, thereby causing it to be susceptible to chipping. Moreover, these conventional treatments do not strengthen or increase the tensile properties of the underlying base material itself. In an embodiment of the present invention, a base material having a protective layer thereon may be subjected to the present invention process as follows.

The base material having a protective layer thereon is soaked in a moderately heated non-electrolyzed salt bath which contains activated-electrolyzed metallic titanium. Sodium dioxide and a salt selected from the group consisting of sodium cyanate and potassium cyanate is present in the salt bath. Additionally, up to about 20 w/w % of $NaCO_2$ or sodium chloride may further be added. To the bath is added from about 2 to about 20 micrograms of electrolyzed metallic titanium. The base material having a protective layer thereon is soaked in the bath for from about 10 minutes to 24 hours at from about 430° C. to about 670° C. The electrolyzed titanium catalyzes the diffusion of the titanium and nitride from the bath into both the base material and the protective layer thereon.

In accordance with this embodiment of the present invention process, titanium and nitrogen diffuses and fills the voids of the protective layer, while also diffusing and filling in the voids of the base material. In this way, the diffusion from the protective layer en route to the underlying base material forms a resulting titanium interface or network therebetween. This interface or network provides for the added benefit of providing better adhesion between the protective layer and the underlying base material. Accordingly, titanium and nitride surprisingly diffuses into not only the base material, but also the protective layer thereon, using the process of the present invention.

Example 1

Figure 5:
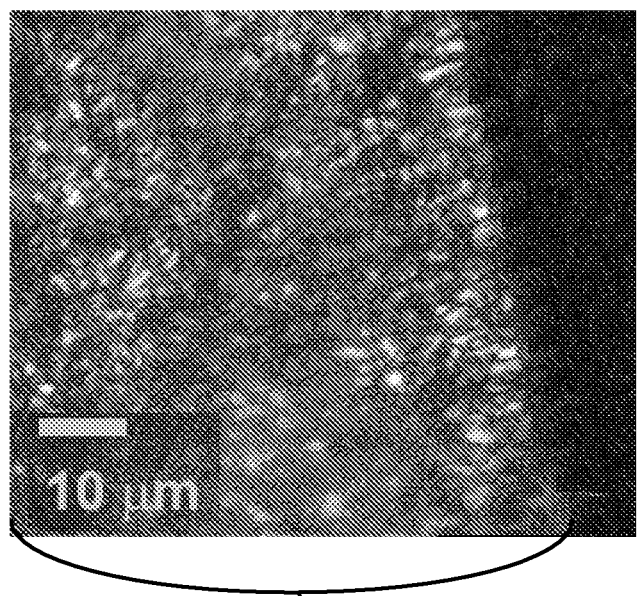
FIG. 5 is a cross-sectional view of a carbide prior to having titanium and nitride diffused therethrough in accordance with an aspect of the present invention.

FIG. 5 illustrates a base material 30a containing carbide prior to having titanium and nitride diffused therethrough. As shown in this figure, the base material 30a is consistently lighter, thereby showing the granular structure of carbide. The base material is subjected to the present invention process as follows.

The base material 30a containing carbide is soaked in a moderately heated non-electrolyzed salt bath which contains activated-electrolyzed metallic titanium. Sodium dioxide and a salt selected from the group consisting of sodium cyanate and potassium cyanate is present in the salt bath. Additionally, up to about 20 w/w % of $NaCO_2$ or sodium chloride may further be added. To the bath is added from about 2 to about 20 micrograms of electrolyzed metallic titanium. The base material 30a containing carbide is soaked in the bath for from about 10 minutes to 24 hours at from about 430° C. to about 670° C. The electrolyzed titanium catalyzes the diffusion of the titanium and nitride from the bath into about 20 to about 100 microns of the base material 30a.

Figure 6:
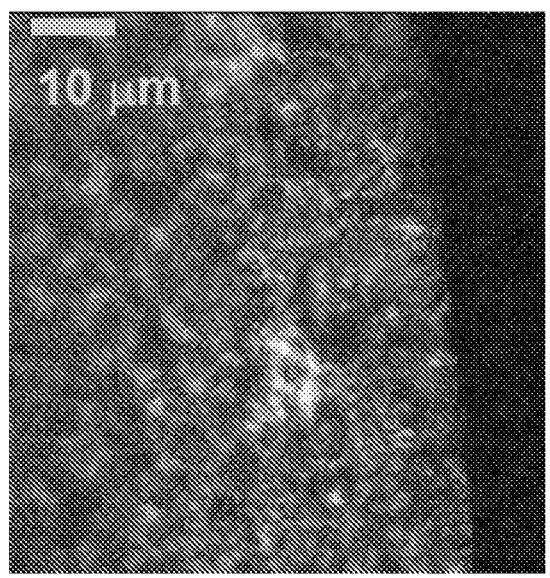
FIG. 6 is a cross-sectional view of a carbide after having titanium and nitride diffused therethrough in accordance with an aspect of the present invention.

As shown in FIG. 6, the diffusion of titanium and nitride is shown to diffuse into more than about 35 microns of the base material 30b. This diffusion is shown as the base material 30b as shown in FIG. 6 is now darker than the base material 30a as shown in FIG. 5. The darkness corresponds to titanium and nitrogen filling in the voids among the grains of the carbide structure. Accordingly, in Example 1, it is illustrated that titanium and nitride surprisingly diffuses into the compact, granular structure of carbide using the process of the present invention.

Example 2

Figure 7:
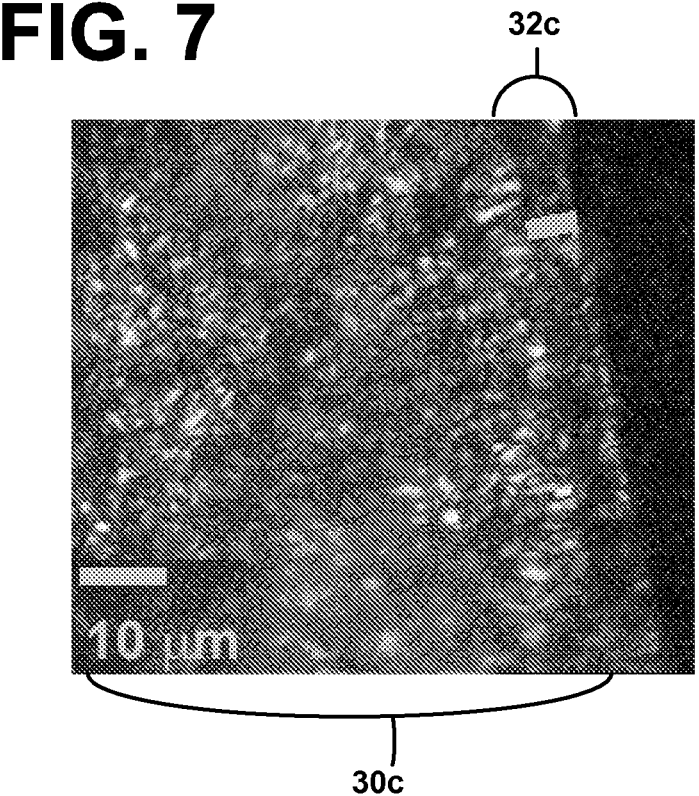
FIG. 7 is a cross-sectional view of a carbide treated with a Chemical Vapor Deposition (CVD) process and prior to having titanium and nitride diffused therethrough in accordance with an aspect of the present invention.

FIG. 7 illustrates a carbide treated with a Chemical Vapor Deposition (CVD) process and prior to having titanium and nitride diffused therethrough in accordance with an aspect of the present invention. As discussed above, conventional nitriding surface treatments are deficient coatings or surface treatments for materials containing carbide. The protective layer formed by these conventional processes, such as a CVD process, generally has a weak adhesion with the carbide surface, thereby causing it to be susceptible to chipping. Moreover, these conventional treatments do not strengthen or increase the tensile properties of the carbide itself.

FIG. 7 illustrates a protective layer 32c produced by a CVD process. As further illustrated in FIG. 7, there is a distinct interface and demarcation between the protective layer 32c and the carbide surface of the base material 30c, thereby illustrating a relatively weak adhesion therebetween. FIG. 7 further illustrates that the CVD process does not strengthen or increase the tensile properties of the carbide itself. This is shown as the underlying carbide of the base material 30c as shown in FIG. 7 is similar in structure and color to the untreated carbide of the base material 30a as shown in FIG. 5. More specifically, the base materials 30a, 30c, which both contain carbide, are consistently lighter in both figures, thereby depicting the granular structure of carbide. The base material 30c having a protected layer 32c thereon may be subjected to the present invention process as follows.

The base material 30c containing carbide and having a protective layer 32c thereon is soaked in a moderately heated non-electrolyzed salt bath which contains activated-electrolyzed metallic titanium. Sodium dioxide and a salt selected from the group consisting of sodium cyanate and potassium cyanate is present in the salt bath. Additionally, up to about 20 w/w % of $NaCO_2$ or sodium chloride may further be added. To the bath is added from about 2 to about 20 micrograms of electrolyzed metallic titanium. The base material 30c containing carbide and having a protective layer 32c thereon is soaked in the bath for from about 10 minutes to 24 hours at from about 430° C. to about 670° C. The electrolyzed titanium catalyzes the diffusion of the titanium and nitride from the bath into both the base material 30c and the protective layer 32c thereon.

Figure 8:
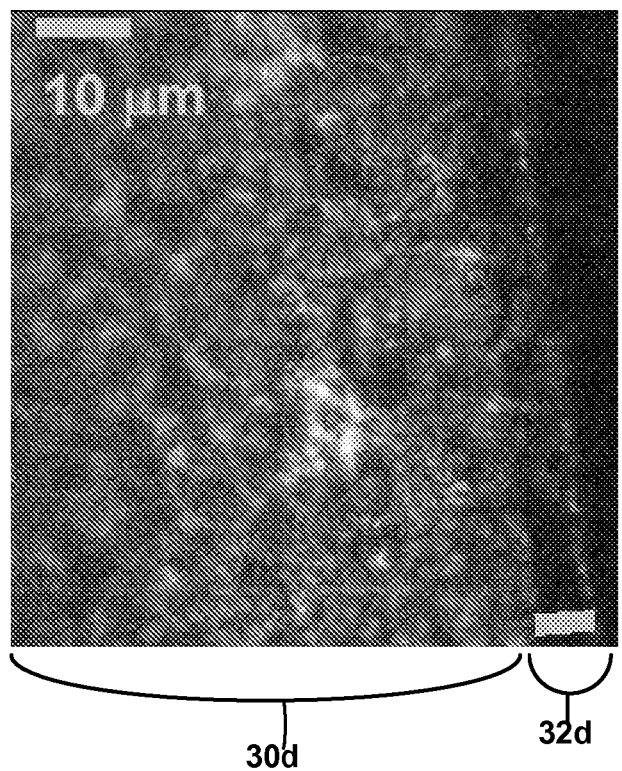
FIG. 8 is a cross-sectional view of a carbide treated with a Chemical Vapor Deposition (CVD) process and after having titanium and nitride diffused therethrough in accordance with an aspect of the present invention.

As shown in FIG. 8, the diffusion of titanium and nitride is shown to diffuse into both the protective layer 32d and the base material 30d. This diffusion is shown as the previously lighter material in FIG. 7 is now darker as shown in FIG. 8. The darkness appears in both the protective layer 32d and the underlying carbide in the base material 30d. Accordingly, titanium and nitrogen diffuses and fills the voids of the protective layer 32d, while also diffusing and filling in the voids among the grains of the carbide structure of the base material 30d. In this way, the diffusion from the protective layer 32d en route to the underlying carbide in the base material 30d forms a resulting titanium interface or network therebetween. This interface or network provides for the added benefit of providing better adhesion between the protective layer 32d and the underlying base material 30d. Accordingly, in Example 2, it is illustrated that titanium and nitride surprisingly diffuses into not only the compact, granular structure of carbide, but also the protective layer thereon, using the process of the present invention.

Example 3

A metal alloy comprising carbide was used as a base material for a turning insert. The base material additionally included vanadium. The turning insert was further treated with a CVD process. This turning insert was treated by soaking in a heated salt bath (NaCNO and about 10 w/w % of $NaCO_2$), for 2 hours at 545° C. in which 2-20 micrograms of electrolyzed metallic titanium was added. The turning insert was then cooled and dried. The insert was then washed to remove an oxidation layer formed as a result of heat being applied thereto during and after the diffusion process.

The aforementioned turning insert treated with the present invention process was tested and compared to a turning insert treated only with a CVD process under the same operating parameters:

| Material Machined | Carbon Steel |
|---|---|
| Work Diameter | 19" |
| Spindle Speed (SFPM) | 330 |
| Feed Rate IPR | 0.04 |
| Depth of Cut | 0.25" per side |
| Length of Cut | 4'9" |
| No. of Passes | 8 |

After testing, the turning insert treated with the present invention process was surprisingly shown to have only slight wear. In contrast, the turning insert treated with only the CVD process showed significant chipping which resulted in catastrophic failure of the cutting tool.

Example 4

A metal alloy comprising carbide was used as a base material for a turning insert. The base material additionally included vanadium. The turning insert was further treated with a CVD process. This turning insert was treated by soaking in a heated salt bath (NaCNO and about 10 w/w % of $NaCO_2$), for 2 hours at 545° C. in which 2-20 micrograms of electrolyzed metallic titanium was added. The turning insert was then cooled and dried. The insert was then washed to remove an oxidation layer formed as a result of heat being applied thereto during and after the diffusion process.

The aforementioned turning insert treated with the present invention process was tested and compared to a turning insert treated only with a CVD process under the same operating parameters:

| Material Machined | Carbon Steel |
|---|---|
| Work Diameter | 17" |
| Spindle Speed (SFPM) | 330 |
| Feed Rate IPR | 0.035 |
| Depth of Cut | 0.25" per side |
| Length of Cut | 5'9" |
| No. of Passes | 11 |

After testing, the turning insert treated with the present invention process was surprisingly shown to have only slight wear. In contrast, the turning insert treated with only the CVD process showed significant chipping which resulted in catastrophic failure of the cutting tool.

It will be gleamed from the above examples and data that treatment of a base material comprising carbide with the present invention surprisingly resulted in the diffusion titanium and nitride into the compact, granular structure of carbide. Moreover, treatment of a base material having a protective layer thereon with the present invention process surprisingly resulted in the diffusion of titanium and nitride into the protective layer. The diffusion from the protective layer en route to the underlying carbide further resulted in a titanium interface or network therebetween, thereby providing the added benefit of a better adhesion between the protective layer and the underlying base material. The excellent operating results were further obtained by the method of the present invention.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A method for diffusing titanium and nitride into a base material comprising:
   providing a base material having a compact, granular microstructure;
   providing a salt bath which includes sodium dioxide and a salt selected from the group consisting of sodium cyanate and potassium cyanate;
   dispersing metallic titanium formed by electrolysis of a titanium compound, in said bath;
   heating the salt bath to a temperature ranging from about 430° C. to about 670°; and
   soaking the material in the salt bath for a time of from about 10 minutes to about 24 hours.

2. The method of claim 1 further comprising prolonging the soaking time in order to facilitate the diffusion of titanium and nitride into the base material.

3. The method of claim 1 wherein said salt bath is a non-electrolyzed salt bath.

4. The method of claim 3 wherein said salt bath includes up to about 20 w/w % of an added salt selected from the group consisting of sodium carbon dioxide, sodium carbonate, and sodium chloride.

5. The method of claim 1 wherein said salt bath includes up to about 20 w/w % of an added salt selected from the group consisting of sodium carbon dioxide, sodium carbonate, and sodium chloride.

6. The method of claim 1 wherein the soaking temperature ranges from about 500° C. to about 650° C.

7. The method of claim 1 further comprising treating the base material before soaking the material in the salt bath.

8. The method of claim 7 wherein the base material is treated using treatment selected from the group consisting of heat treatment a nanocoating process, a ceramic coating process, Physical Vapor Deposition (PVD) process a Chemical Vapor Deposition (CVD) process, and an Ion Assisted Coating (IAC) process.

9. The method of claim 1 further comprising treating the base material after soaking the material in the salt bath.

10. The method of claim 9 wherein the base material is treated using treatment selected from the group consisting of heat treatment, a nanocoating process, a ceramic coating process, a Physical Vapor Deposition (PVD) process, a Chemical Vapor Deposition (CVD) process, and an Ion Assisted Coating (LAC) process.

11. The method of claim 1 wherein the base material contains carbide.

12. The method of claim 11 wherein the base material containing carbide is selected from the group consisting of boron carbide, chromium carbide, iron carbide, niobium carbide, silicon carbide, tantalum carbide, titanium carbide, tungsten carbide, vanadium carbide, zirconium carbide, ceramic carbide, and carbide alloy.

13. The method of claim 1 wherein the base material is a metal base material.

14. A method for diffusing titanium and nitride into a base material comprising:
   providing a base material containing carbide;
   providing a salt bath which includes sodium dioxide and a salt selected from the group consisting of sodium cyanate and potassium cyanate;
   dispersing metallic titanium formed by electrolysis of a titanium compound, in said bath;
   heating the salt bath to a temperature ranging from about 430° C. to about 670° C.; and
   soaking the material in the salt bath for a time of from about 10 minutes to about 24 hours.

15. The method of claim 14 wherein the base material containing carbide is selected from the group consisting of boron carbide, chromium carbide, iron carbide, niobium carbide, silicon carbide, tantalum carbide, titanium carbide, tungsten carbide, vanadium carbide, zirconium carbide, ceramic carbide, and carbide alloy.

16. The method of claim 14 further comprising prolonging the soaking time in order to facilitate the diffusion of titanium and nitride into the base material.

17. The method of claim 14 wherein said salt bath is a non-electrolyzed salt bath.

18. The method of claim 17 wherein said salt bath includes up to about 20 w/w % of an added salt selected from the group consisting of sodium carbon dioxide, sodium carbonate, and sodium chloride.

19. The method of claim 14 wherein said salt bath includes up to about 20 w/w % of an added salt selected from the group consisting of sodium carbon dioxide, sodium carbonate, and sodium chloride.

20. The method of claim 14 wherein the soaking temperature ranges from about 500° C. to about 650° C.

21. The method of claim 14 further comprising treating the base material before soaking the material in the salt bath.

22. The method of claim 21 wherein the base material is treated using treatment selected from the group consisting of heat treatment, a nanocoating process, a ceramic coating process, a Physical Vapor Deposition (PVD) process, Chemical Vapor Deposition (CVD) process, and an Ion Assisted Coating (IAC) process.

23. The method of claim 14 further comprising treating the base material after soaking the material in the salt bath.

24. The method of claim 23 wherein the base material is treated using treatment selected from the group consisting of heat treatment, a nanocoating process, a ceramic coating process, a Physical Vapor Deposition (PVD) process, a Chemical Vapor Deposition (CVD) process and an Ion Assisted Coating (IAC) process.

25. The method of claim 21 wherein the base material includes is a metal base material.

* * * * *